US008402549B2

(12) United States Patent  
Funabashi et al.

(10) Patent No.: US 8,402,549 B2  
(45) Date of Patent: Mar. 19, 2013

(54) APPLICATION SOFTWARE PROTECTING METHOD AND STREAM TRANSMITTING/RECEIVING SYSTEM

(75) Inventors: Ryoichi Funabashi, Kawasaki (JP); Makiko Konoshima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 111 days.

(21) Appl. No.: 13/118,882

(22) Filed: May 31, 2011

(65) Prior Publication Data

US 2011/0231938 A1   Sep. 22, 2011

Related U.S. Application Data

(63) Continuation of application No. PCT/JP2009/070701, filed on Dec. 10, 2009.

(30) Foreign Application Priority Data

Dec. 12, 2008  (JP) .................................. 2008-316808

(51) Int. Cl.  
    *G06F 21/22* (2006.01)  
(52) U.S. Cl. ........................ 726/26; 713/152; 713/189  
(58) Field of Classification Search ................ 726/26; 713/152, 189  
See application file for complete search history.

(56) References Cited

U.S. PATENT DOCUMENTS

| 7,757,097 | B2 * | 7/2010 | Atallah et al. ................. 713/187 |
| 2009/0204859 | A1 * | 8/2009 | Cousins ......................... 714/701 |

FOREIGN PATENT DOCUMENTS

| JP | 2000-311136 | 11/2000 |
| JP | 2002-055726 | 2/2002 |
| JP | 2002-055727 | 2/2002 |
| JP | 2002-062946 | 2/2002 |
| JP | 2003-333039 | 11/2003 |
| JP | 2003-345662 | 12/2003 |
| JP | 2004-289684 | 10/2004 |
| JP | 2007-086957 | 4/2007 |
| JP | 2008-198016 | 8/2008 |

OTHER PUBLICATIONS

International Search Report for PCT/JP2009/070701, mailed Jan. 26, 2010.

* cited by examiner

*Primary Examiner* — Matthew Smithers  
(74) *Attorney, Agent, or Firm* — Staas & Halsey LLP

(57) ABSTRACT

A protection method of application software is executed by initiating the first program transmitted from a server via a network on a client, and the method divides an execution result of the application software executed on the client into a plurality of pieces of intermediate data in accordance with distribution arrangement information reported by the server, distributes and arranges the plurality of pieces of intermediate data in the server and the client, transmits to the server notice information including a data length and arranged location information of each piece of the distributed and arranged plurality of pieces of intermediate data, rearranges the distributed and arranged plurality of pieces of intermediate data in the original order of the execution result of the application software on the basis of the notice information, generates in the server a second program for generating the execution result, and transmits the second program to the client.

15 Claims, 15 Drawing Sheets

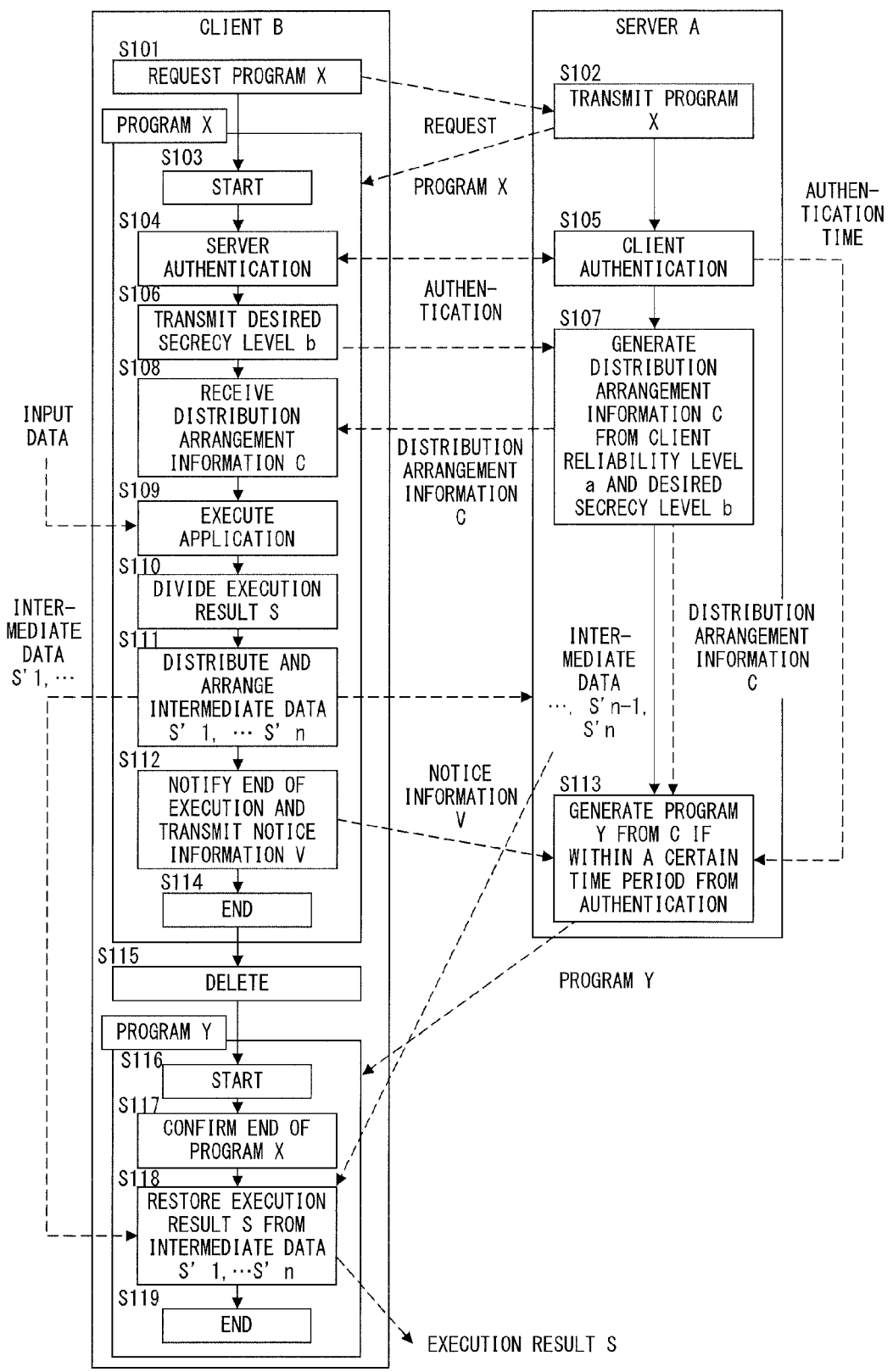
F I G. 1

FIG. 2A

CLIENT RELIABILITY LEVEL CALCULATION TABLE

| | ORGANIZATION (U) | USE FREQUENCY (V) | | UNAUTHORIZED USE (W) | |
|---|---|---|---|---|---|
| 0 | COMPETITOR | 0 | FREQUENT | 0 | UNAUTHORIZED USE FOUND |
| 20 | UNRELATED OR UNATTACHED | : | : | 100 | UNAUTHORIZED USE NOT FOUND |
| 40 | CUSTOMER | 100 | FIRST TIME | | |
| 60 | AFFILIATED COMPANIES | | | | |
| 100 | WITHIN COMPANY | | | | |

DETERMINATION OF DIVIDED UNIT

| RELIABILITY LEVEL a | DIVIDED UNIT |
|---|---|
| a<10 | SMALLEST PROCESSING UNITS (e.g., MACRO BLOCK) |
| a<30 | SECOND SMALLEST UNITS (e.g., MACRO BLOCK LINE OR SLICE) |
| a<50 | THIRD SMALLEST UNITS (e.g., PICTURE) |
| a<70 | FOURTH SMALLEST UNITS (e.g., GOP (GROUP OF PICTURE)) |
| a<90 | FIFTH SMALLEST UNITS (e.g., PLURAL GOP) |
| 90≦ | SEVERAL SECONDS UNITS |

F I G. 2 B

| DESIRED SECRECY LEVEL b | DESIRED DISTRIBUTION ARRANGEMENT METHOD |
|---|---|
| 0 | TRANSMIT ALL INTERMEDIATE DATA TO SERVER A |
| 20 | TRANSMIT HALF OF INTERMEDIATE DATA TO SERVER A |
| 40 | TRANSMIT KEYFRAMES AND FRAMES EXCLUDING CERTAIN KEYS TO SERVER A |
| 60 | TRANSMIT ALL KEYFRAMES TO SERVER A |
| 80 | TRANSMIT ALL HEADER INFORMATION OF FRAMES TO SERVER A |
| 100 | TRANSMIT ALL HEADER INFORMATION OF KEYFRAMES TO SERVER A |

OPTION IN DESIRED SECRECY LEVEL

F I G. 2 C

TABLE OF DISTRIBUTION ARRANGEMENT INFORMATION C

| a \ b | 0-20 | 21-40 | 41-60 | 61-80 | 81-100 |
|---|---|---|---|---|---|
| 0 | DIVIDE IN BLOCK UNITS, TRANSMIT ALL TO SERVER | DIVIDE IN HEADER UNITS, TRANSMIT ALL TO SERVER | DIVIDE IN FRAME UNITS, TRANSMIT ALL TO SERVER | DIVIDE IN KEYFRAME UNITS, TRANSMIT ALL TO SERVER | DIVIDE IN SEVERAL-SECOND UNITS, TRANSMIT ALL TO SERVER |
| 20 | DIVIDE IN BLOCK UNITS, TRANSMIT HALF OF BLOCKS TO SERVER | DIVIDE IN HEADER UNITS, TRANSMIT HALF OF HEADERS AND HALF OF FRAMES TO SERVER | DIVIDE IN FRAME UNITS, TRANSMIT HALF OF FRAMES TO SERVER | DIVIDE IN KEYFRAME UNITS, TRANSMIT HALF OF FRAMES TO SERVER | DIVIDE IN FRAME UNITS, TRANSMIT HALF OF FRAMES TO SERVER |
| 40 | DIVIDE IN BLOCK UNITS, TRANSMIT KEYFRAME BLOCKS AND SOME FRAME BLOCKS TO SERVER | DIVIDE IN HEADER UNITS, TRANSMIT HALF OF HEADERS AND HALF OF FRAMES TO SERVER | DIVIDE IN FRAME UNITS, TRANSMIT KEYFRAMES AND SOME FRAMES TO SERVER | DIVIDE IN KEYFRAME UNITS, TRANSMIT KEYFRAMES AND SOME FRAMES TO SERVER | DIVIDE IN FRAME UNITS, TRANSMIT KEYFRAMES AND SOME FRAMES TO SERVER |
| 60 | DIVIDE IN BLOCK UNITS, TRANSMIT KEYFRAME BLOCKS TO SERVER | DIVIDE IN HEADER UNITS, TRANSMIT HALF OF HEADER OF KEYFRAMES TO SERVER | DIVIDE IN FRAME UNITS, TRANSMIT KEYFRAMES TO SERVER | DIVIDE IN FRAME UNITS, TRANSMIT KEYFRAMES TO SERVER | DIVIDE IN FRAME UNITS, TRANSMIT KEYFRAMES TO SERVER |
| 80 | DIVIDE IN HEADER UNITS AND OTHER THAN HEADER UNITS. TRANSMIT FRAME HEADERS TO SERVER | DIVIDE IN HEADER UNITS AND OTHER THAN HEADER UNITS. TRANSMIT FRAME HEADERS TO SERVER | DIVIDE IN HEADER UNITS AND OTHER THAN HEADER UNITS. TRANSMIT FRAME HEADERS TO SERVER | DIVIDE IN HEADER UNITS AND OTHER THAN HEADER UNITS. TRANSMIT FRAME HEADERS TO SERVER | DIVIDE IN HEADER UNITS AND OTHER THAN HEADER UNITS. TRANSMIT FRAME HEADERS TO SERVER |
| 100 | DIVIDE IN HEADER AND OTHER THAN HEADER UNITS, TRANSMIT KEYFRAME HEADER TO SERVER | DIVIDE IN HEADER AND OTHER THAN HEADER UNITS, TRANSMIT KEYFRAME HEADER TO SERVER | DIVIDE IN HEADER AND OTHER THAN HEADER UNITS, TRANSMIT KEYFRAME HEADER TO SERVER | DIVIDE IN HEADER AND OTHER THAN HEADER UNITS, TRANSMIT KEYFRAME HEADER TO SERVER | DIVIDE IN HEADER AND OTHER THAN HEADER UNITS, TRANSMIT KEYFRAME HEADER TO SERVER |

F I G. 3

EXAMPLE OF TABLE OF NOTICE INFORMATION V

| NUMBER | TIME INFORMATION | DATA TYPE | DATA LENGTH L | ARRANGED LOCATION |
|---|---|---|---|---|
| 1 | t1 | HEADER 11 | l1 | SERVER A: 1ST |
| 2 | t1 | MB111 | l2 | CLIENT C: 4TH |
| 3 | t1 | MB112 | l3 | CLIENT C: 2ND |
| ... | | | | |
| n | t2 | HEADER 12 | l4 | SERVER A: 3RD |
| n+1 | t2 | MB121 | l5 | CLIENT C: 1ST |
| n+2 | t2 | MB122 | l6 | CLIENT C: 3RD |
| ... | | | | |

F I G. 5

APPLICATION SOFTWARE PROTECTING METHOD AND STREAM TRANSMITTING/RECEIVING SYSTEM

CROSS-REFERENCE TO RELATED APPLICATION

This application is a continuation application of International PCT Application No. PCT/JP2009/070701 which was filed on Dec. 10, 2009.

This application is based upon and claims the benefit of priority of the prior Japanese Patent Application No. 2008-316808, filed on Dec. 12, 2008, the entire contents of which are incorporated herein by reference.

FIELD

The present invention relates to an application software protecting method and a server, and relates to a technical field of a protecting method of, for example, application software that transmits programs including encoding applications for generating an image stream from a server to a client via a network and that is executed at the client end and relates to a stream transmitting/receiving system having this protecting method.

BACKGROUND

In a transmitting/receiving system in which data is transmitted and received by using application software sent through a network, because application software is placed at the client end, there is a possibility of unauthorized execution of the application software at the client end by methods such as providing a pseudo server.

An example of a method that has been conventionally known as a typical method for protecting such application software from unauthorized execution is a method in which a handshake between a server and a client is performed via network communications so that the server can recognize the program execution status at the client end point by point, and the application software is made available only during a certain period of time from a point in time at which the client receives a permission signal to use the application software from the server. A method for protecting application software from unauthorized use by dividing data to be transmitted and received so as to obfuscate the data has been also known.

RELATED ART

Patent Document

Patent Document 1: Japanese Patent Application Publication No. 2003-345662
Patent Document 2: Japanese Patent Application Publication No. 2002-55726

As described above, in a configuration that allows a server end to obtain operation content at a client end, detailed data is transmitted/received between the client and the server. In the transmission/reception of the detailed data, information such as data owned by a user and detailed operation content may be disclosed to external servers, and it is not possible to meet a user's request of avoiding disclosure of a user's own data, for example. In the method of dividing and transmitting/receiving data, processing content becomes complicated for dividing and combining data, and there is a risk that there may be an additional technical problem of lowered performance in data transmission/reception. On the other hand, by simply dividing data, the obtained protection effect is not necessarily sufficient since the original data can be restored in a relatively easy manner.

In particular, when streams such as image data are handled as data to be transmitted/received, a connection between clients needs to be maintained for a relatively long period of time, which may result in an increase in the risk of attacks such as unauthorized access.

SUMMARY

In order to solve the above problem, the disclosed protection method of application software is a method for protecting application software executed by initiating on a client a first program transmitted from a server via a network, comprising a distribution arrangement step of dividing an execution result of the application software executed on the client into a plurality of pieces of intermediate data in accordance with distribution arrangement information reported by the server, and distributing and arranging the plurality of pieces of intermediate data in the server and the client, a first transmission step of transmitting to the server notice information including a data length and arranged location information of each piece of the distributed and arranged plurality of pieces of intermediate data, a program generation step of generating in the server a second program for rearranging the distributed and arranged plurality of pieces of intermediate data in an original order of the execution result of the application software on the basis of the notice information, and generating the execution result, and a second transmission step of transmitting the second program to the client.

In order to solve the above problem, the disclosed stream transmitting and receiving system is a stream transmitting and receiving system, comprising a client, and a server that can transmit a first program including application software executed on the client via a network, wherein the client comprising a distribution arrangement unit for dividing an execution result of the application software into a plurality of pieces of intermediate data in accordance with distribution arrangement information reported by the server and for distributing and arranging the plurality of pieces of intermediate data in the server and the client, and a first transmission unit for transmitting to the server notification information including data length and arranged location information of each of the distributed and arranged plurality of pieces of intermediate data, and wherein the server comprising a program generation unit for rearranging the distributed and arranged plurality of pieces of intermediate data in an original order of the execution result of the application software on the basis of the notification information, and for generating a second program for generating the execution result, and a second transmission unit for transmitting the second program to the client.

The length of the intermediate data is information unique to the input data to which the application software is applied, and the length cannot be identical unless the input data is identical. Accordingly, the second program is valid only to the execution result of the application software executed to specific input data, and when the execution result is divided, the second program rearranges the distributed and arranged intermediate data in the original order and restores the original execution result. For that reason, even if a user establishes a pseudoserver and attempts to use the previously acquired application software repeatedly, the original order of the distributed and arranged intermediate data cannot be restored with the second program as caused by spoofing since the input data is different from the previous input data.

In other words, when the input data is divided into plural pieces of intermediate data and the plural pieces are distributed and arranged, different distributions and arrangements are made for each input data, and different second programs for each input data are used for restoration of the original order. For that reason, application software is valid only to single input data and therefore the application software can be suitably protected from unauthorized use.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 1 is a diagram illustrating a process flow of the first operation example of application software protection;

FIG. 2 illustrates tables indicating a mode of processing on the basis of a client reliability level and a desired secrecy level;

FIG. 3 is a table of distribution arrangement information;

FIG. 5 is a table presenting an example data length and arranged location information included in generated notice information V for each header and macro block;

DESCRIPTION OF EMBODIMENTS

Figure 4:
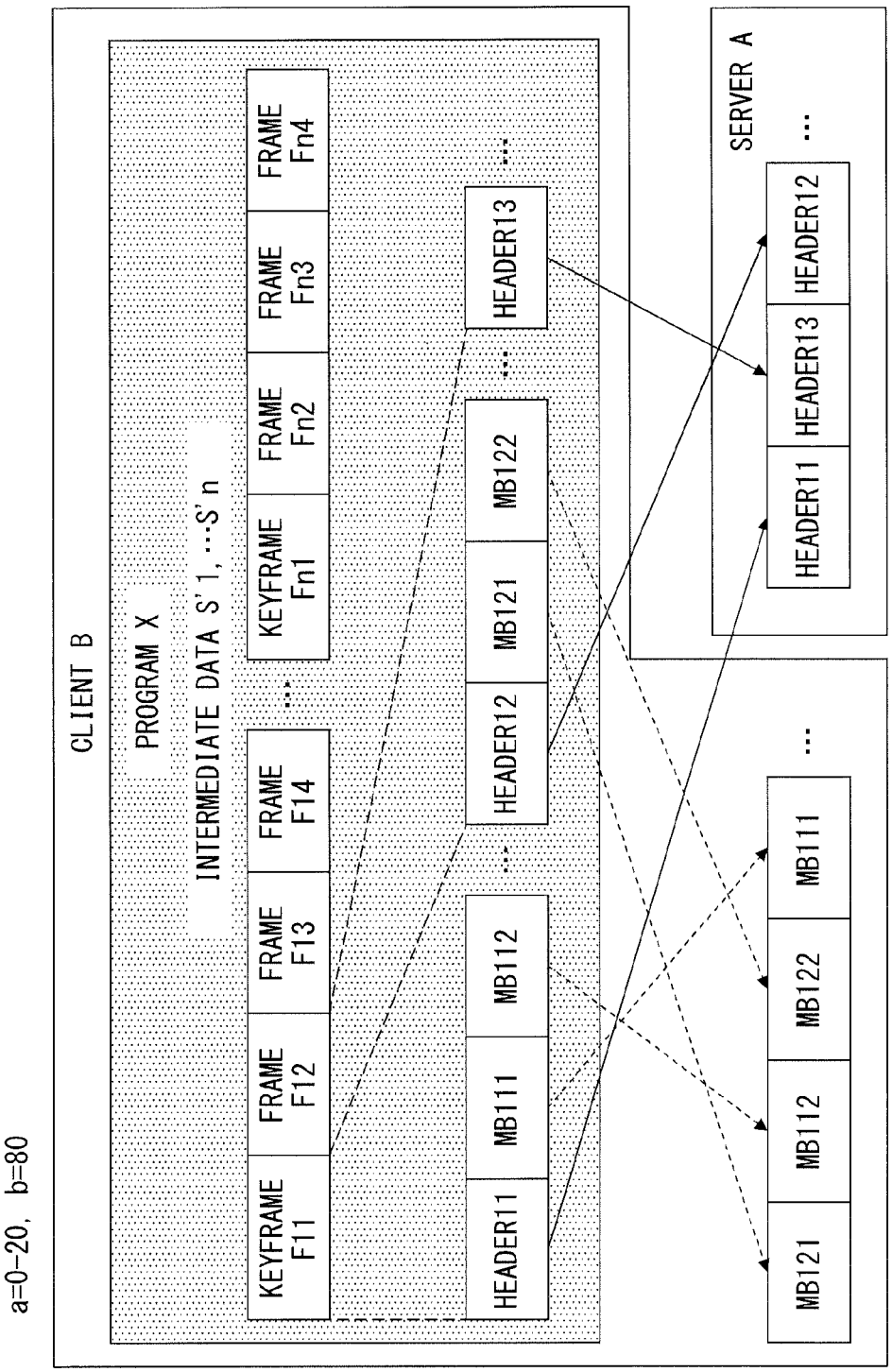
FIG. 4 is a diagram illustrating an embodiment in which the intermediate data is shuffled, distributed and arranged.

In the following description, embodiments of the present invention are explained with reference to the drawings.

(1) First Operation Example of Protecting Application Software

A process flow of the first operation example of protecting application software according to the present embodiment is explained with reference to FIG. 1 to FIG. 5.

(1-1) Example of Process Flow

Firstly, the first operation example of the protecting operation of application software according to the embodiment is explained with reference to FIG. 1. FIG. 1 is a diagram illustrating a process flow of the first operation example in the embodiment of the disclosed protecting operation of application software. As illustrated in FIG. 1, the first operation example of the embodiment of the application software protecting operation is adopted in a data transmitting/receiving system including a server A and a client B mutually connected via a network.

The client B that receives an input of input data requests that the server A send a program X including application software such as an encoder that the client B seeks to use (step S101). The server A sends the requested program X to the client B (step S102). The client B initiates the sent program X (step S103).

When the program X is initiated, an authentication process is performed between the client B and the server A by using the program X (steps S104 and S105), and the server A stores in a memory a point in time when the client B authenticated the client B.

The client B transmits a desired confidential level b to the server A by using the program X (step S106). The server A generates distribution arrangement information C from the reliability level a of the client B and the desired confidential level b of the client B, and transmits the distribution arrangement information C to the client B (step S107). After receiving the distribution arrangement information C (step S108), the client B, by using the program X, executes application software such as an encoder to the input data (steps S109).

By using the program X, the client B divides an execution result S of the application software after the execution into plural intermediate data s1, . . . , sn in accordance with the distribution arrangement information C (step S110), and distributes and arranges the intermediate data in the client B and in a storage device in the server A (step S111). The client B transmits to the server A notice information V including data length L of each piece of the intermediate data s1, . . . , sn and arrangement position information as well as a notice of execution completion of the program X (step S112).

When the point in time at which the notice information V is transmitted from the client B is within a certain time period from a point in time at which the client B is authenticated, the server A generates a program Y for restoration of the execution result from the notice information V including the data length L of each piece of the intermediate data s1, . . . , sn and the arrangement position information, and sends the restoration program Y to the client B (step S113).

In the meantime, the client B terminates the process execution of the program X (step S114), deletes the program X (steps S115), and initiates the restoration program Y (step S116). After checking the process termination of the program X (steps 117), the restoration program Y rearranges the order of the intermediate data s1, . . . , sn distributed and arranged at random into the original order, outputs the execution result S (step S118), and completes the execution (step S119).

(1-2) Implementation Example of Generation of Distribution Arrangement Information C The implementation example of generating the distribution arrangement information C for determining how to distribute and arrange the intermediate data s1, . . . , sn from the reliability level of the client B (client reliability level a) held by the server A end and the desired secrecy level of the intermediate data (desired secrecy level) b reported by the client B, which is explained in the process flow illustrated in FIG. 1, is explained with reference to FIGS. 2A to 2C.

Prior to the process, the server A, first, determines the client reliability level a of the client B. The server A determines the client reliability level a of the client B on the basis of an organization (U) to which the client B belongs, and usage such as use frequency (V) of programs of the same sort and unauthorized use history (W). Here, FIG. 2A is an example of a client reliability level calculation table indicating various conditions for calculating the client reliability level a.

The server A refers to the client reliability level calculation table in FIG. 2A and calculates and determines the client reliability level a on the basis of values set for, for example, the organization (U) to which the client B belongs, the use frequency (V) of programs of the same sort, and unauthorized use experience in the past (W), and by averaging the values. It should be noted that at that time, the server A may calculate the client reliability level a by arbitrarily weighting each of the variables in accordance with the data to be processed and in accordance with clients.

In the example in the table in FIG. 2A, the client reliability level a takes a smaller value for a lower reliability level and a larger value for a higher reliability level. More specifically, in the example in FIG. 2A, as a value set in an organization (U) to which a client B belongs, "0" is set to represent competitor organizations, "20" is set to represent unrelated or unattached organizations, "40" is set to represent customers, "60" is set to represent affiliated companies, and "100" is set to represent within a company. In the example in FIG. 2A, as the values set to the use frequency (V) of programs of the same sort, the lower limit is set to 0 and the upper limit is set to 100, and a larger value is set for a higher use frequency. Furthermore, in the example in FIG. 2A, as values set to the unauthorized use experience in the past (W), "0" is set when unauthorized use was found in the past, and "100" is set when no unauthorized use is found in the past.

In order for the program X to divide the execution result S into intermediate data s1, . . . sn, firstly, a divided unit of the execution result S needs to be determined. In this operation example, a divided unit of the execution result S is determined on the basis of the client reliability level a of the client B. Here, the mode of determining a divided unit of the intermediate s1, . . . sn included in the distribution arrangement information C is explained with reference to FIG. 2B. Here, FIG. 2B is a table illustrating criteria for determining the divided unit of the execution result S on the basis of the client reliability level a.

As illustrated in FIG. 2B, the program X divides the execution result S into smaller units with a lower client reliability level and divides the execution result S into larger units with a higher client reliability level, in accordance with the client reliability level a. Because the restoration becomes more difficult when image data is divided into smaller units and the restoration is facilitated when image data is divided into larger units, a higher protection effect can be expected for a client with a low reliability level.

For example, as illustrated in FIG. 2B, when the client reliability level a is less than 10, a dividing shuffling unit 110 divides the execution result S into the smallest processing units (e.g., macro block units). When the client reliability level a is 10 or larger and less than 30, the dividing shuffling unit 110 divides the execution result S into the second smallest units (e.g., macro block line or slice units). When the client reliability level a is 30 or larger and less than 50, the dividing shuffling unit 110 divides the execution result S into the third smallest units (e.g., picture units). When the client reliability level a is 50 or larger and less than 70, the dividing shuffling unit 110 divides the execution result S into the fourth smallest units (e.g., GOP (Group Of Picture) units). When the client reliability level a is 70 or larger and less than 90, the dividing shuffling unit 110 divides the execution result S into the fifth smallest units (e.g., plural GOP (Groups Of Picture) units). When the client reliability level a is 90 or larger, the dividing shuffling unit 110 divides the execution result S into several data unit seconds (i.e., data units having several seconds in their regeneration time period).

The program X also determines a mode for distribution and arrangement of every piece of plural intermediate data s1, which are divided into divided units determined as above, in the server A and the client B. Particularly, in this operation example, the program X determines a mode of distribution and arrangement of intermediate data on the basis of the desired secrecy level b of the execution result S, which is reported by the client B. Here, the desired secrecy level b is a value to determine the degree of data protection in transmission/reception of the intermediate data, and as illustrated in FIG. 2C, for example, the desired secrecy level b is determined in accordance with a method of distribution and arrangement that a user desires.

On the basis of the client reliability level a and the desired secrecy level b determined above, the server A generates the distribution arrangement information C. Here, FIG. 3 presents an example of a table for determining the distribution arrangement information C to be generated. According to the distribution arrangement information C in FIG. 3, the mode of dividing the intermediate data and transmitting to the server is determined as described below on the basis of the values of the client reliability level a and the desired secrecy level b.

[When the Value of the Desired Secrecy Level b is 0]

When the value of the client reliability level a is 0 to 20, the data is divided into block units and all is transmitted to the server A. When the value of the client reliability level a is 21 to 40, the data is divided into header units and all is transmitted to the server A. When the value of the client reliability level a is 41 to 60, the data is divided into frame units and all is transmitted to the server A. When the value of the client reliability level a is 61 to 80, the data is divided into keyframe units and all is transmitted to the server A. When the value of the client reliability level a is 81 to 100, the data is divided into several-second units and all is transmitted to the server A.

[When the Value of the Desired Secrecy Level b is 20]

When the value of the client reliability level a is 0 to 20, the data is divided into block units and half of the blocks are transmitted to the server A. When the value of the client reliability level a is 21 to 40, the data is divided into header units and half of the headers and half of the frames are transmitted to the server A. When the value of the client reliability level a is 41 to 60, the data is divided into frame units and half of the frames are transmitted to the server A in the frame units. When the value of the client reliability level a is 61 to 80, half of the frames are transmitted to the server A in keyframe units. When the value of the client reliability level a is 81 to 100, the data is divided randomly into frame units and half of the frames are transmitted to the server A.

[When the Value of the Desired Secrecy Level b is 40]

When the value of the client reliability level a is 0 to 20, the data is divided into block units and blocks in keyframes and blocks in some frames are transmitted to the server A. When the value of the client reliability level a is 21 to 40, the data is divided into frame units and half of the headers and half of the frames are transmitted to the server A. When the value of the client reliability level a is 41 to 60, the data is divided into frame units and keyframes and some frames are transmitted to the server A. When the value of the client reliability level a is 61 to 80, the data is divided into frame units and keyframes and some frames are transmitted to the server A. When the value of the client reliability level a is 81 to 100, the data is divided into frame units and keyframes and some frames are transmitted to the server A.

[When the Value of the Desired Secrecy Level b is 60]

When the value of the client reliability level a is 0 to 20, the data is divided into block units and blocks in keyframes are transmitted to the server A. When the value of the client reliability level a is 21 to 40, the data is divided into frame units and half of the headers in keyframes are transmitted to the server A. When the value of the client reliability level a is 41 to 60, the data is divided into frame units and keyframes are transmitted to the server A. When the value of the client reliability level a is 61 to 80, the data is divided into frame units and keyframes are transmitted to the server A. When the value of the client reliability level a is 81 to 100, the data is divided into frame units and keyframes are transmitted to the server A.

[When the Value of the Desired Secrecy Level b is 80]

When the value of the client reliability level a is 0 to 20, the data is divided into units of headers and units other than headers and frame headers are transmitted to the server A. When the value of the client reliability level a is 21 to 40, the data is divided into units of headers and units other than headers and frame headers are transmitted to the server A. When the value of the client reliability level a is 41 to 60, the data is divided into units of headers and units other than headers and frame headers are transmitted to the server A. When the value of the client reliability level a is 61 to 80, the data is divided into units of headers and units other than headers and frame headers are transmitted to the server A. When the value of the client reliability level a is 81 to 100, the data is divided into units of headers and units other than headers and frame headers are transmitted to the server A.

[When the Value of the Desired Secrecy Level b is 100]

When the value of the client reliability level a is 0 to 20, the data is divided into units of headers and units other than headers and keyframe headers are transmitted to the server A. When the value of the client reliability level a is 21 to 40, the data is divided into units of headers and units other than headers and keyframe headers are transmitted to the server A. When the value of the client reliability level a is 41 to 60, the data is divided into units of headers and units other than headers and keyframe headers are transmitted to the server A. When the value of the client reliability level a is 61 to 80, the data is divided into units of headers and units other than headers and keyframe headers are transmitted to the server A. When the value of the client reliability level a is 81 to 100, the data is divided into units of headers and units other than headers and keyframe headers are transmitted to the server A.

(1-3) Embodiment of Distribution Arrangement Operation

Next, embodiments of the distribution arrangement operation (step S111 in FIG. 1) in which the program X distributes and arranges the intermediate data to the server A and the client B in accordance with the distribution arrangement information C determined as described above are explained with reference to FIG. 4 and FIG. 5.

FIG. 4 illustrates a mode of the distribution and arrangement and in particular a case in which the value of the client reliability level a is 0 to 20 and the value of the desired secrecy level b is 80 in the distribution arrangement operation. Moreover, the embodiment illustrated in FIG. 4 receives the image stream generated by application software for an encoder in the program X as input data. Such an image stream consists of keyframes and frames, and each frame consists of a header and data other than the header such as a Macro Block (MB), for example.

In general, since the data lengths of each of the frames are different from one another, the data lengths of a header and an MB in each frame are also different. The example in FIG. 4 illustrates an example of a case in which the value of the desired secrecy level b is 80 and the value of the client reliability level a is 0 to 20, and the data is divided into units of headers and units other than headers and the headers are arranged in the server A in accordance with the distribution arrangement information C.

As illustrated in FIG. 4, the program X randomly shuffles the order of a header 11 of a keyframe F11, a header 12 of a frame F12, and a header 13 of a frame F13 of the intermediate data and arranges them in the server A in the order of the header 11, the header 13, and the header 12, for example. The order of macro blocks MB111, MB112, of the keyframe F11 and macro blocks MB121, MB122, of the frame F12 is randomly shuffled, and MB121, MB112, MB122, and MB111 are arranged in the client B in this order, for example.

When distributing and arranging the intermediate data, the program X further generates notice information V including information that associates the data length L and the arranged location of each piece of intermediate data. FIG. 5 is a table presenting an example of the generated notice information V. The program X, when distributing and arranging the intermediate data, generates information of frame types, data lengths, and arranged locations as the notice information V, including information representing correspondence relationships between the data lengths and the arranged locations as illustrated in FIG. 5, and stores the information in the table. It should be noted that the program X may generate the notice information V that includes time information (e.g., information representing a time stamp or a frame order) of each piece of intermediate data, as illustrated in FIG. 5.

As described above, the program X of this operation example divides the execution result S for each header and MB, randomly shuffles the order, and distributes and arranges the divided execution result S in the server A and the client B.

The program Y aligns the intermediate data in the client B in the order of the original image stream based on the information of the data length L and the arranged location of each piece of intermediate data by referring to the table illustrating the correspondence relations between the data length and the arranged locations in the above notice information V, and outputs the data as a complete image stream.

In the first operation example of protecting application software described above, the server A generates the program X and transmits the program X to the client B, and also generates the distribution arrangement information C and transmits the information C to the client B. The client B divides the execution result S of the application software into plural pieces of intermediate data s1, s2, . . . in accordance with the distribution arrangement information C, and distributes and arranges the data in the server A and the client B in a random order.

The data lengths L1, L2, . . . of the intermediate data s1, s2, . . . become unique data lengths, depending on input data to be processed by the application software of the program X, and the data lengths L1, L2, . . . of the intermediate data s1, s2, . . . are transmitted to the server A. The server A generates the program Y for restoration that converts the intermediate data s1, s2, into the execution result S on the basis of the data lengths L1, L2, . . . and that arranges position information of the intermediate data s1, s2, . . . , and transmits the program Y for restoration to the client B.

Here, the input data is image data, the application software of the program X is an encoder, the execution result S is bit streams, and identical intermediate data length L1 or intermediate data length L2 . . . cannot be obtained from different input data.

According to the above-described configuration, even if a user who illegally acquired content of a transmission/reception between the server A and the client B via a network attempts unauthorized use of the program X by setting a pseudoserver to pass off as the server A, a valid execution result S cannot be obtained unless the program X is used with the identical input data. Since the execution result S from the identical input data is a result that has already been obtained by the client B by executing the program X, users gain no benefit from obtaining the identical execution result S many times. Accordingly, it is possible to protect application software from unauthorized use.

It should be noted that by generating the distribution arrangement information C on the basis of the reliability information a of the client B and information of desired secrecy level b reported by the client B, distribution and arrangement that comply with requests from the server end and the client end can be achieved.

If a point in time at which the data length and the arranged location of each piece of intermediate data is reported by the client B is within a certain time period from the verification time of the client B, it is possible to fortify the protection against unauthorized uses of the program X by generating the program Y for restoration.

The program Y for restoration can prevent the program X from being stored in the client B for all time and fortify the protection against unauthorized uses of the program X by a configuration in which restoration processes are performed after confirming that the program X activated in the client B has been deleted and terminated.

(2) Second Operation Example of Protecting Application Software

A process flow of the second operation example of protecting application software according to the present embodiment is explained by reference to FIG. 6 to FIG. 13.

(2-1) Example of Process Flow

Firstly, a flow of the processing in the second operation example of the protecting operation of application software according to the embodiment is explained by reference to the process flow in FIG. 6. It should be noted that in the process flow in FIG. 6, the same operations as those in the process flow according to the first embodiment, which is illustrated in FIG. 1, are assigned the same reference numerals and the explanations of the operations are omitted. In addition, points that are not specifically explained may have the same configuration as that of the first operation example.

Figure 6:
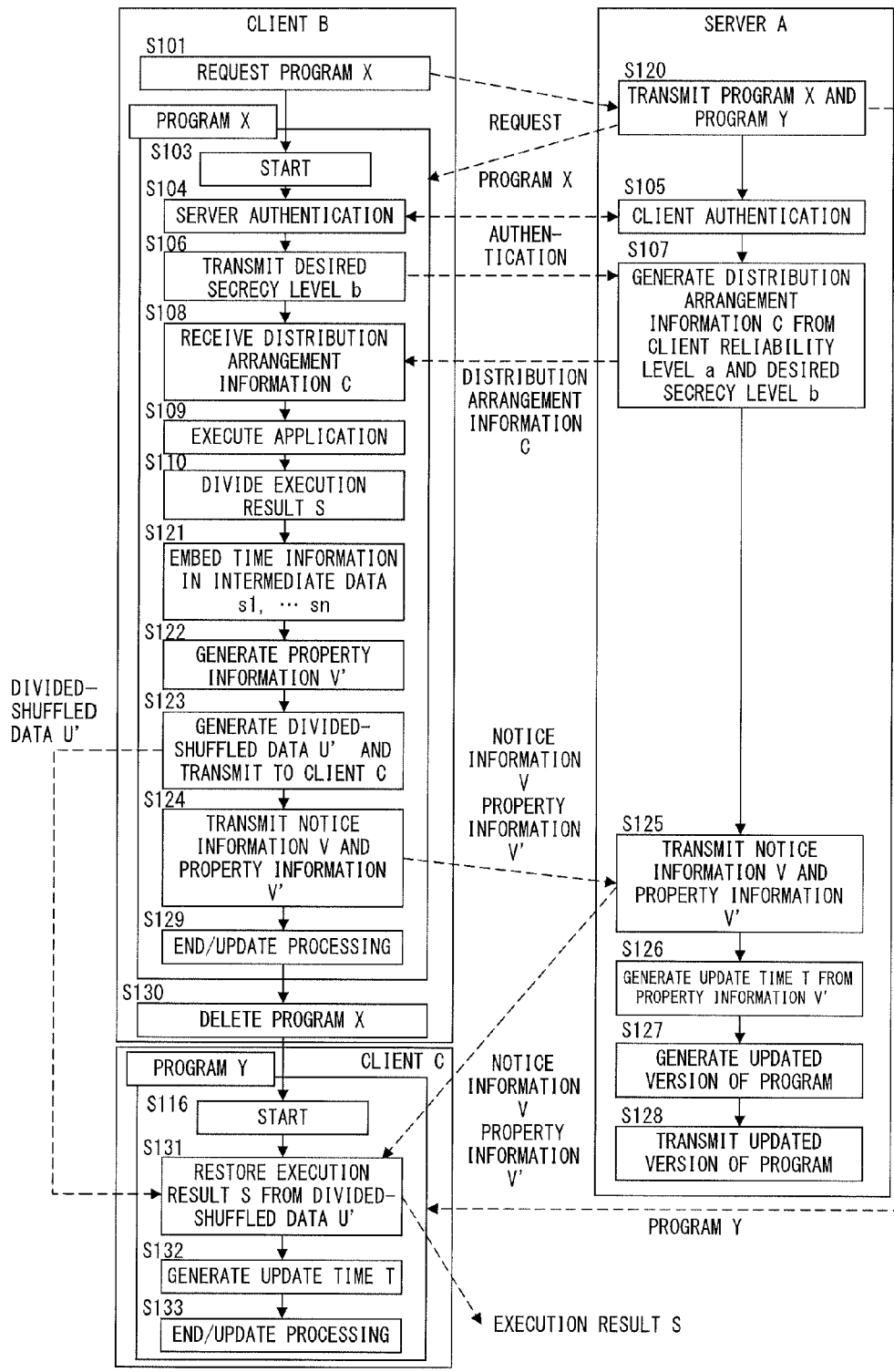
FIG. 6 is a diagram illustrating a process flow of the second operation example of application software protection.

As illustrated in FIG. 6, the second operation example of the embodiment of the application software protecting operations is adopted in a data transmitting/receiving system including a server A, the first client B in which the program X is executed, and the second client C in which the program Y is executed, each of which is mutually connected via a network. In the second operation example, the input data is an image stream, application software is an encoder, and an execution result S is a bit stream.

In the second operation example, the server A transmits the program x including application software for encoding to the first client B in response to a request transmitted from the first client B as well as transmitting the program Y for restoration to the second client C (step S120).

After the initiation of the program X, a server authentication, transmission of the desired secret level b, and execution of an application (from step S103 to step S109), the first client B divides the execution result S after the application software execution into plural intermediate data s1, . . . sn, in accordance with the distribution arrangement information C (step S110). Next, the program X embeds into each packet header of the divided plural intermediate data s1, . . . sn time information in accordance with a point in time of regeneration of each piece of intermediate data on the basis of an internal clock of the first client B (step S121). The program X furthermore generates property information V' including the above time information and property information indicating a property of at least one of the input data and the execution result S (step S122).

Next, the first client B rearranges the generated plural intermediate data s1, . . . , sn by shuffling the chronological order in the original execution result S, thereby generating divided-shuffled data U'. The first client B also transmits the generated divided-shuffled data U' to the second client C (step S123).

The first client B then transmits the notice information V including the data length L, arranged location information and time information of each piece of intermediate data s1, . . . sn, and generated property information V' together with the notification of the execution completion of the program X (step S124).

The server A transmits the transmitted notice information V and the property information V' to the second client C (step S125). At that time, by determining whether or not a point in time at which the notice information V and the property information V' are reported by the first client B, for example, is within a certain time period from a point in time at which the client B is authenticated, or whether or not the time information included in the notice information V is within a certain time period from a program X update time T, which is explained later, whether the notice information V and the property information V' have been transmitted or not may, be determined on the basis of the result of the above determination. Details of these determinations are explained later.

The server A, in addition, generates an update time T on the basis of the property information V' transmitted from the first client B (step S126). Updated versions of the program X for encoding and the program Y for restoration of the execution result are generated from the notice information V that includes the data length L and the arranged location information of each piece of the intermediate data s1, . . . , sn (step S127). At that time, the server A generates update time T and embeds the generated update time Tin the program X. The server A transmits the updated version of the program X to the first client B, and transmits the updated version of the program Y to the second client C (step S128).

At that time, the first client B ends the process execution of the program X, executes the updated version of the program X (step S129), and deletes the program X that ended the operation (step S130). The update operations of the program X are explained in detail later.

Meanwhile, the second client C initiates the program Y for restoration transmitted from the server A (see step S120) (step S116). The program Y for restoration outputs the execution result S by rearranging the divided-shuffled data U', which is typically the intermediate data s1, . . . sn randomly shuffled from its chronological order, so as to be in the original order on the basis of the notice information V and the property information V' transmitted from the server A (step S131).

In addition, the second client C generates the update time T by using the program Y on the basis of the property information V' transmitted from the server A (step S132). This update time T is preferably the time information indicating the same point in time as the time of the time information generated in step S126 by the server A, although the descriptions have been made different for convenience. The second client C ends the process execution of the program Y and executes the updated version of the program Y (step S133).

(2-2) Example of Configuration of the Data Transmitting/Receiving System According to the Second Operation Example Next, further details of a flow of each process in the second operation example are explained by reference to FIG. 7 to FIG. 10 while explaining a basic configuration of the data transmitting/receiving system to which the application software protecting method according to the second operation example is applied.

Figure 7:
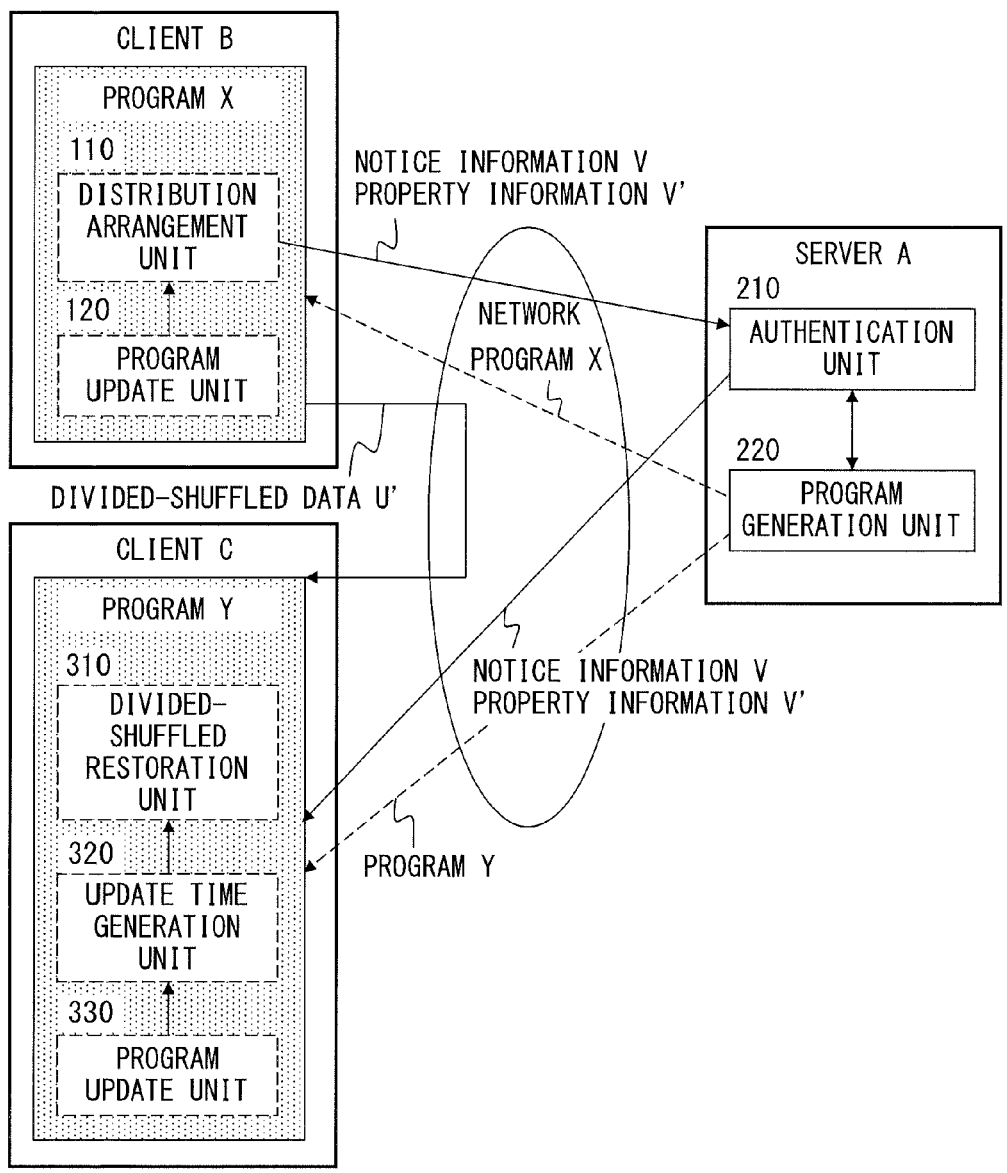
FIG. 7 is a block diagram schematically illustrating a configuration of a data transmitting/receiving system in which the second operation example of application software protection is executed, and transmitted/received data.

Firstly, FIG. 7 is a schematic diagram illustrating an example of the entire configuration of a data transmitting/receiving system 1 to which the application software protecting method according to the second operation example is applied. As illustrated in FIG. 7, the data transmitting/receiving system 1 is configured to include the server A, the first client B in which the program X is executed, and the second client C in which the program Y is executed, each of which is mutually connected via a network.

The first client B is a terminal for data processing and transmission such as a personal computer etc. for transmitting streams used for teleconference systems, and it executes the program X transmitted from the server A. As illustrated in FIG. 7, the program X includes a distribution arrangement unit 110 and a program update unit 120 as a logical processing block in which the program X is realized by being executed on a CPU not illustrated in the drawing.

The second client C is a terminal for data processing and reception such as a personal computer etc., for receiving streams etc. transmitted from the first client B and used for teleconference systems, and it executes the program Y transmitted from the server A. As illustrated in FIG. 7, the program Y includes a divided-shuffled restoration unit 310, an update time generation unit 320, and a program update unit 330 as a logical processing block in which the program Y is realized by being executed on a CPU not illustrated in the drawing.

The server A is a server for management which is connected to the first client B and the second client C via a network. The server A receives intermediate data, notice information V, and property information V' etc., which are transmitted from the first client B, and includes an authentication unit 210 for performing authentication and a program generation unit 220 for generating the program X and the program Y and transmitting the programs to the first client B and the second client C, respectively.

Figure 8:
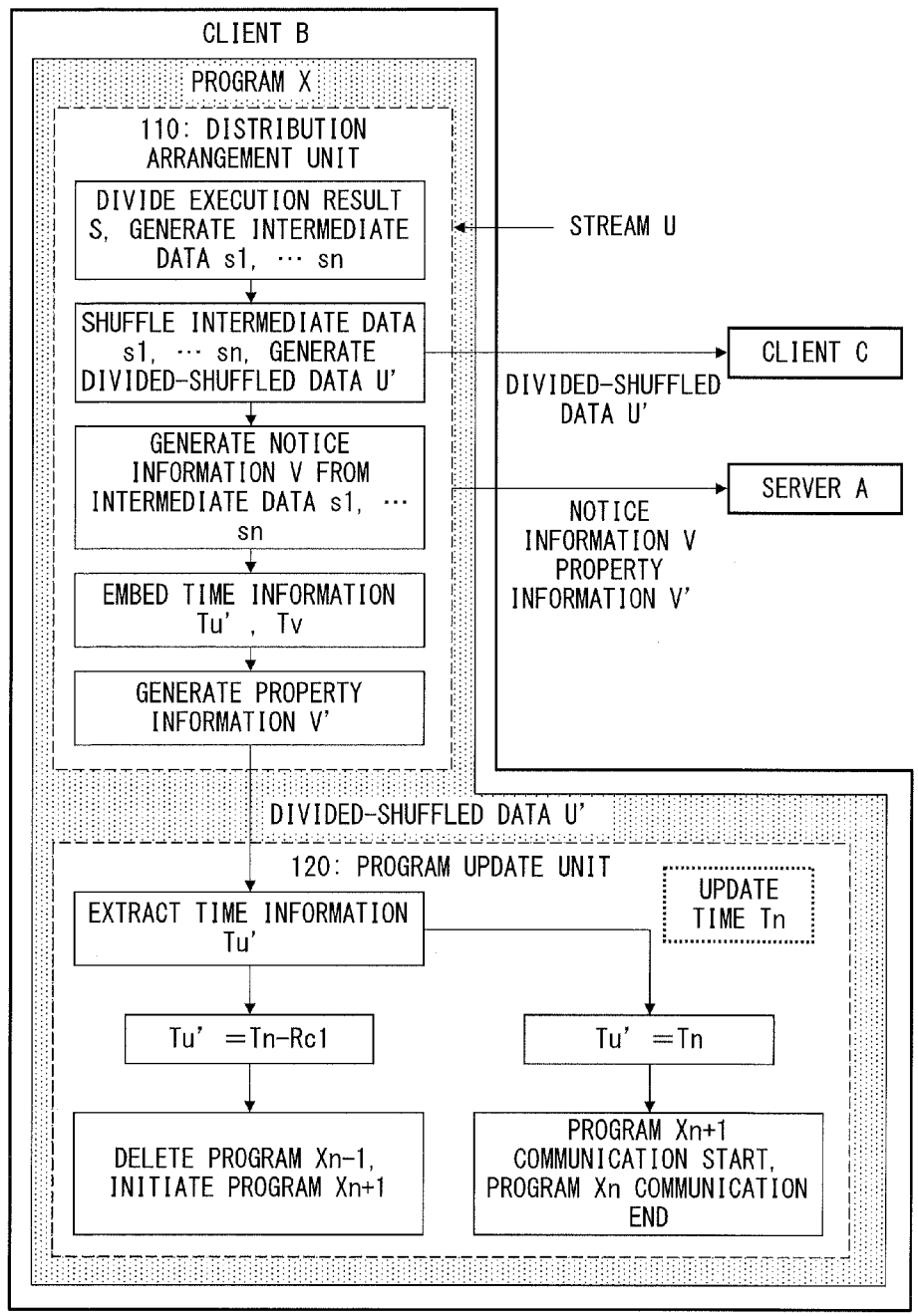
FIG. 8 is a schematic diagram illustrating a configuration of each unit in the first client and an example of operations according to the second operation example.
Figure 9:
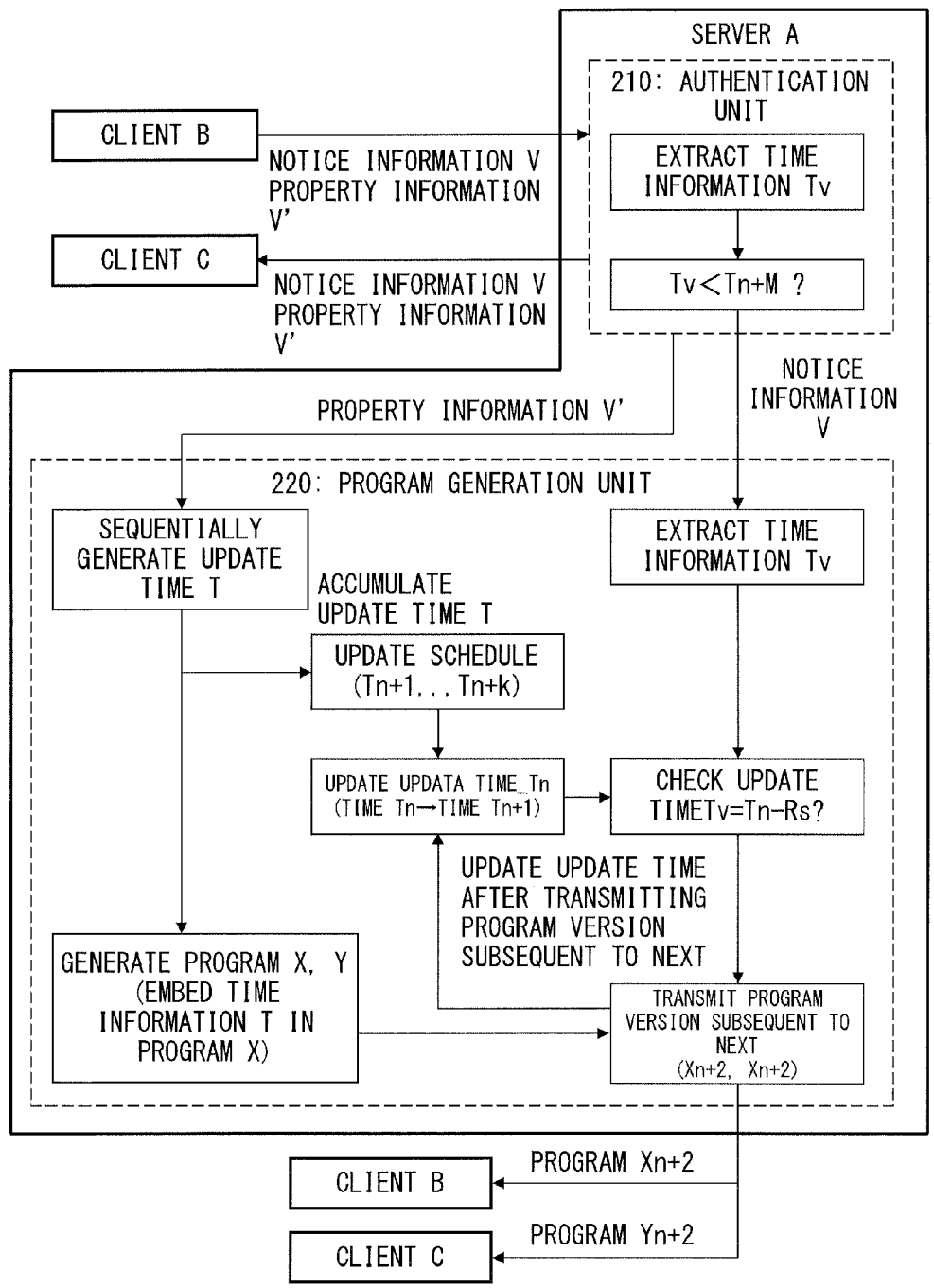
FIG. 9 is a schematic diagram illustrating a configuration of each unit in the server and an example of operations according to the second operation example.
Figure 10:
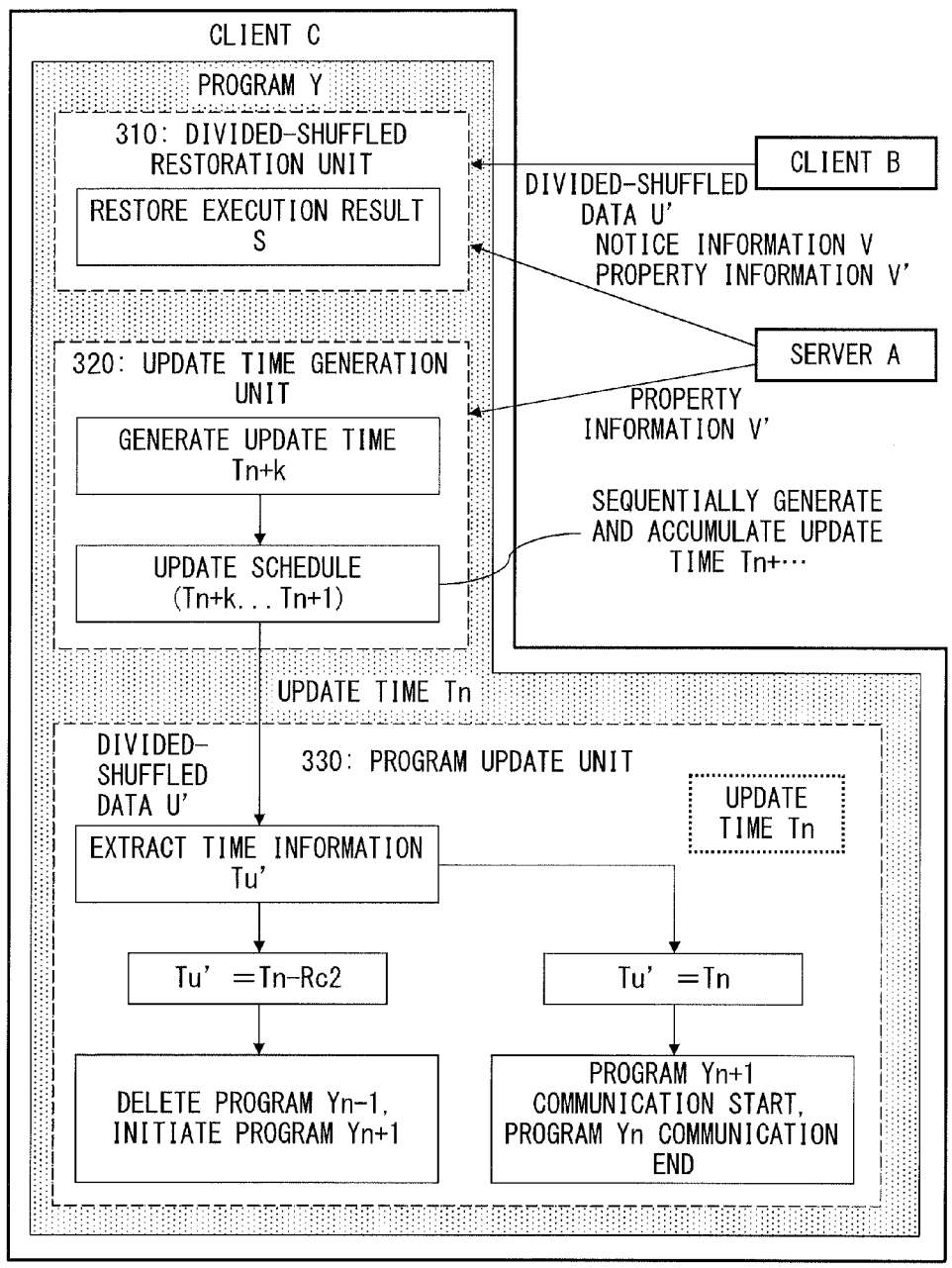
FIG. 10 is a schematic diagram illustrating a configuration of each unit in the second client and an example of operations according to the second operation example.

Next, the configuration and operations of each unit are explained in more detail by reference to FIG. 8 to FIG. 10.

(2-2-1) Configuration and Operation Example of First Client B

Firstly, the detailed configuration and an example of operations of the program X executed in the first client B are explained by reference to FIG. 8.

The distribution arrangement unit 110 divides the execution result S from the execution of processing such as encoding by application software to input data into plural intermediate data s1, . . . , sn on the basis of the distribution arrangement information C generated in the server A, and generates divided-shuffled data U' in which the chronological order of the plural intermediate data s1, . . . sn in the original execution result S is shuffled. The generated divided-shuffled data U' is transmitted to the second client C.

The distribution arrangement unit 110 generates each length of data of the above intermediate data s1, . . . sn and notice information V including arranged location information after shuffling (i.e. in the divided-shuffled data U').

The distribution arrangement unit 110 embeds time information into a packet header of each piece of the generated intermediate data s1, . . . sn and a packet header of the notice information V in accordance with a regeneration time of each piece of the internal data s1, . . . sn with reference to a point in time at which processing to the execution result S is carried out. It should be noted that the time information is generated with reference to the internal time of the first client B when the processing to the execution result S is carried out, and indicates a point in time at which the regeneration time of each piece of the intermediate data s1, . . . sn is added to the internal time. Since the time information is embedded in packet headers of each piece of the intermediate data s1, . . . sn at that time, the divided-shuffled data U' that is the intermediate data s1, . . . sn with a shuffled and rearranged order should include plural pieces of time information. The plural pieces of time information embedded in the divided-shuffled data U' is henceforth referred to as time information Tu' collectively, and the time information embedded in the notice information is henceforth referred to as time information Tv.

Next, the distribution arrangement unit 110 generates the property information V' including property information indicating at least one property of the execution result S and the divided-shuffled data U'.

Here, the property information is for example size information of each piece of the above intermediate data s1, . . . sn, the amount of movement information, and the time information embedded in each packet header.

It should be noted that the property information V' has a data structure based on the order of the intermediate data s1, . . . sn in the execution result S or the divided-shuffled data U'. Typically, the property information V' is made of property information for each divided stream (i.e., the size information, the amount of movement information, and the time information embedded in each packet header) arranged in an order of the intermediate data s1, . . . sn of the execution result S or the divided and shuffled execution result S.

The program X transmits the divided-shuffled data U' to the second client C and the notice information V and the property information V' to the server A, each being transmitted through a network.

The program X in the present embodiment, after being transmitted from the server A, starts the operation at a certain timing, and carries out the communication with the second client C and the server A. Afterwards, the program X ends the communication at a certain timing, and is deleted after that (i.e., the program X deletes itself). Meanwhile, in the first client B, the updated version of the program X that is transmitted from the server A at a certain timing, as explained later, starts the operation, and carries out the communication with the second client C and the server A.

For the program X that is updated arbitrarily as described above, the $n^{th}$ version of the program X is denoted as program Xn for convenience, and henceforth each version of the updated program X is collectively referred to simply as program X. In the same manner, for the program Y, the $n^{th}$ version of the program Y is denoted as program Yn for convenience, and henceforth each version of the updated program Y is collectively referred to simply as program Y.

The program update unit 120 controls each of the operations including initiating each version of the program X, starting and ending communications, and performing deletion at a certain timing to carry out update operations of the program X. For example, the program update unit 120 receives the next version of the program X (e.g. program Xn+1) and initiates the program Xn+1 as well as ending the currently operating program X (e.g. program Xn). Here, certain timing refers to the timing determined on the basis of the time information embedded in each of the intermediate data s1, . . . , sn included in the divided-shuffled data U', and the update information T generated by the server A explained later and embedded into the program X.

Plural pieces of the update time T are generated (e.g., the update times T1, T2, . . . , Tn), and each is embedded into a corresponding program X and each designates the timing in controlling the operations in each version of the program X. The time information T embedded in the $n^{th}$ version of program Xn of the program X is henceforth described as time information Tn, and each of the plural pieces of the generated time information T is collectively referred to simply as time information T.

More specifically, the program update unit 120 sequentially extracts the time information Tu' to be embedded in the packet headers of each piece of intermediate data s1, . . . sn from the property information V' generated in the distribution arrangement unit 110. The extracted time information Tu' is compared with the update time Tn to be embedded in the program Xn. The program Xn deletes the previous version of the program Xn−1 and initiates the next version of the program Xn+1 at a timing at which the time information Tu' matches a point in time at which the update time Tn is tracked back to a certain time Rc1 (i.e. (Tn)−Rc1). The program Xn starts communication with the server A and the second client C of the next version of program Xn+1 and ends the communication of the program Xn itself at a timing at which the time information Tu' matches the update time Tn.

The update operations of the above-explained program and the determination operations of the update timing of the program are explained later in detail.

(2-2-2) Configuration and Operation Example of Server A

Next, the detailed configuration and operation example of each unit in the server A are explained by reference to FIG. 9.

Regarding the notice information V and the property information V' transmitted from the first client B, firstly, whether or not each piece of the data was validly generated by the program X is determined in the authentication unit 210. For example, the authentication unit 210 compares the time information Tv extracted from the notice information V with the update time Tn of the program Xn that generated the notice information V. The authentication unit 210 determines whether or not each piece of the data was validly generated by the program X on the basis of whether or not the time information Tv is within a certain time period M from the update time Tn.

As a result of the determination, when it is determined that the notice information V and the property information V' are validly generated by the program X, the server A transmits the notice information V and the property information V' to the second client C. In addition, the authentication unit 210 inputs the notice information V and the property information V' to the program generation unit 220.

The program generation unit 220 generates the program X and the program Y, and transmits the program X to the first client B and the program Y to the second client C. The program generation unit 220, in addition, arbitrarily generates the updated versions of the program X and the program Y and transmits the updated versions of the program X and the program Y at a certain update time T.

More specifically, the program generation unit 220 sequentially generates the update time T on the basis of the property information V' and accumulates the generated update time T as an update schedule. It should be noted that specific generation operations of the update time T are explained later.

Moreover, the program generation unit 220 sequentially generates each version of the program X and the program Y and preferably accumulates the plural generated programs. In particular, the program generation unit 220, in generating each version of the program X, embeds the update time T generated in the above manner. For example, the $n^{th}$ version of the program X, the program Xn, is embedded with the update time Tn that is the $n^{th}$-generated update time.

The program generation unit 220 appropriately extracts the time information Tv from the notice information V, and compares the extracted time information Tv with the update time Tn that is accumulated as the update schedule. The program generation unit 220 transmits a version subsequent to the next version of program Xn+2 and program Yn+2, which are generated in advance at a timing at which the time information Tv matches a point in time at which the update time Tn is tracked back to a certain time Rc2 (i.e. (Tn)−Rc2) and accumulated.

After transmitting the version subsequent to the next version of program Xn+2 and program Yx+2, the program generation unit 220 updates the update time Tn at the next update time Tn+1 accumulated in the update schedule, and compares the time that tracks the newly set update time back to the certain time Rc2 (i.e. (Tn+1)−Rs2) with the sequentially extracted time information Tv.

(2-2-3) Configuration and Operation Example of the Second Client C

Next, a detailed configuration and an example of operations in each unit of the program Y executed in the second client C are explained by reference to FIG. 10.

A divided-shuffled restoration unit 310 restores the original execution result S by rearranging and rearranging the divided-shuffled data U' transmitted from the first client B on the basis of the notice information V and the property information V' transmitted from the server A.

An update time generation unit 320 receives an input of the property information V', and generates the update time T used in a program update unit 330 described later. In general, the update time generation unit 320 sequentially generates the update time T on the basis of the property information V' in a similar manner to the generation operations of the update time T in the program generation unit 220 in the server A, and accumulates the generated update time T as an update schedule.

The program update unit 330 controls each of the operations, including performing initiation of each version of the program Y, starting and ending of communications, and performing deletion at certain timings so as to carry out the update operations of the program Y in a manner similar to the program update unit 120 in the program X.

More specifically, the program update unit 330 sequentially extracts the time information Tu' embedded in the packet header of each piece of intermediate data s1, . . . , sn from the property information V' transmitted from the divided-shuffled restoration unit 310. The extracted time information Tu' is compared with the update time Tn generated by the update time generation unit 320. The program Yn deletes the previous version of program Yn−1 at a timing at which the time information Tu' matches a point in time at which the update time Tn is tracked back to a certain time Rc2 (i.e. Tn−Rc2), and initiates the next version of program Yn+1. The program Y also starts communication with the server A of the next version of the program Yn+1 and the first client B at a timing at which the time information Tu' matches the update time Tn.

It should be noted that in the configuration and the operation example of each unit explained above, all of the divided-shuffled data U' generated by the execution result S is transmitted from the first client B to the second client C. However, by extracting a portion or the entirety of the divided-shuffled data U' (i.e. apart of the intermediate data s1, . . . , sn) and including the extracted portion in the notice information V, for example, the portion or the entirety of the divided-shuffled data U' is transmitted to the server A.

(2-3) Update Operation Example of the Program

In the second operation example for application software protection, as described above, determination of a point in time for updating the program X and the program Y is carried out on the basis of the update time T generated on the basis of the property information V' in the program generation unit 220 in the server A or in the update time generation unit 320 in the program Y.

In the first client B, each of plural update times T is embedded in each version of the program X generated in the server A and transmitted from the server A, and a point in time is determined by reference to the update time T. More specifically, the program update unit 120 in the program X extracts the time information Tu' from the divided-shuffled data U' generated in the dividing shuffling unit 110. The program X determines whether or not the time information Tu' matches the update time T, and when the two match one another, update operations of the program X are performed.

In the second client C, since the update time T is not embedded in the program Y transmitted from the server A, the update time T is generated from the property information V' by the operations of the update time generation unit 320. The program update unit 330 of the program Y extracts the time information Tu' from the divided-shuffled data U' transmitted from the first client B. The program Y determines whether or not the time information Tu' matches the update time T, and when the two match one another, update operations of the program Y are performed.

The program generation unit 220 of the server A transmits the updated program X and updated program Y in accordance with the result of comparison between the time information Tv extracted from the notice information V and the update time Tn generated from the property information V'.

It should be noted that although the descriptions have been written differently for convenience, since the pieces of time information respectively extracted in the server A, the first client B and the second client C are time information generated on the basis of identical execution result S or identical divided-shuffled data U', each piece of time information indicates the same point in time. In other words, the time information Tu' and the time information Tv are time information having identical values, and particularly in real-time communications, they can indicate the same point in time at the same timing.

Figure 11:
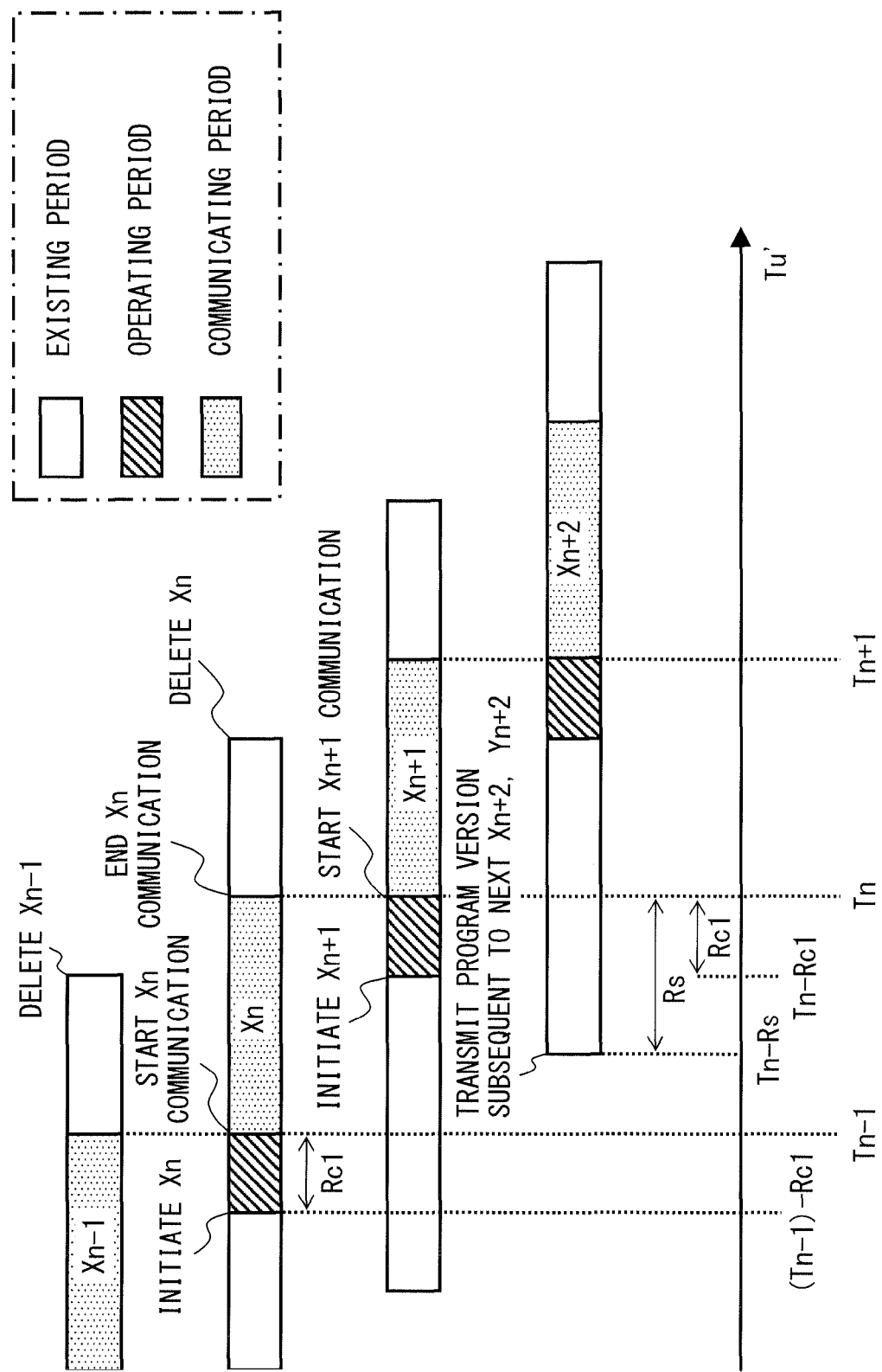
FIG. 11 is a timing chart indicating an example of a mode of updating the programs according to the second operation example.

FIG. 11 is a timing chart illustrating chronological processing relating to updating of the program X in the second operation example of application software protection. Here, update operations in update of the program Xn to the program Xn+1 during the operation of the program Xn are explained by reference to FIG. 11.

As illustrated in FIG. 11, the program X is generated and transmitted by the server A, and the program X has three periods including a period in which the program X is present in the first client B (a blank area in the drawing), a period in which the program X is executed and in operation (a shaded area in the drawing), and a period in which the program X communicates with the server A (a dotted area in the drawing). This is the same for the program Y that is not illustrated in the drawing.

The program Xn executed by the first client B is initiated at a timing at which the time information Tu' extracted from the divided-shuffled data U' matches a time at which a point in time of the update time Tn−1 embedded in the previous version of the program Xn−1 is tracked back to a certain preparation time Rc1 (i.e., (Tn−1)−Rc1). Here, the preparation time Rc1 is a preparation time needed for internal processing from the initiation of the program X to the start of communication in the first client B. Afterwards, the program Xn starts communication with the server A at a timing at which the time information Tu' matches the update time Tn−1, and performs dividing and shuffling of the execution result S and transmission of generated data.

Similarly, the program Yn executed by the second client C starts communication in the same manner, and performs restoration processing of the execution result S in response to the reception of the divided-shuffled data U', the notice information V, and the property information V'. More specifically, the program Yn executed by the second client C is initiated at a timing at which the time information Tu' extracted by the divided-shuffled data U' matches a time at which a point in time of the update time Tn−1 generated in the update time generation unit 320 is tracked back to a certain preparation time Rc2 (i.e., (Tn−1)−Rc2). Here, the preparation time Rc2 is a preparation time needed for internal processing, etc., from the initiation of the program Y to the start of communication in the second client C. Afterwards, the program Yn starts communication with the server A at a timing at which the time information Tu' matches the update time Tn−1. As a result, the program Yn receives a reception of the divided-shuffled data U', the notice information V, and the property information V' and performs the restoration processing of the execution result S.

Next, the program generation unit 220 of the server A transmits the program Xn+2 and the program Yn+2 (i.e., a version subsequent to the next version of programs) to the first client B and the second client C at a timing at which the time information Tv extracted from the notice information V matches a point in time at which the update time Tn generated in the program generation unit 220 is tracked back to a certain preparation time Rs (i.e., (Tn)-Rs). Here, the preparation time Rs is a preparation time needed for communications from generation of the program X in the server A to the start of communication in the first client B and communications from generation of the program Y to the start of commutation in the second client C and internal processing etc.

Next, the first client B starts initiating the next version of program Xn+1 at a timing at which the time information Tu' matches a point in time at which the update time Tn embedded in the program Xn in execution is tracked back to a certain preparation time Rc1 (i.e., Tn-Rc1). The initiated program Xn+1 starts the internal processing for starting communication. At a timing at which the time information Tu' matches the update time Tn, the program Xn ends the communication and also ends the operations. At the same time, the program Xn+1 that ended preparation operations starts communication, and performs dividing and shuffling of the execution result S and transmission of generated data.

Similarly, the second client C starts initiating the next version of the program Yn+1 at a timing at which the time information Tu' matches the update time Tn generated in the update time generation unit 320. The initiated program Yn+1 starts the internal processing for starting communication. At a timing at which the time information Tu' matches the update time Tn, the program Yn ends the communication and also ends the operations. At the same time, the program Yn+1 that ended preparation operations starts communication, and performs restoration processing of the execution result S.

(2-4) Operation Example of Generating Update Time

Generation operations of the update time T in the program generation unit 220 in the server A or in the update time generation unit 320 of the program Y executed by the second client C are explained by reference to FIG. 12 and FIG. 13. In the following description, a method for generating the update time T on the basis of a property of the divided-shuffled data U' from among the plural pieces of time information Tv included in the property information V is explained. It should be noted that in the following description, the explanation is given by using size information or the amount of movement for each dividing and shuffling of the divided-shuffled data U' (in other words, each piece of intermediate data s1, . . . sn) as an example of the property of the divided-shuffled data U'.

Firstly, operations to generate the update time T by using the size information for each divided and shuffled unit are explained by reference to FIG. 12. FIG. 12 is a diagram conceptually illustrating data processing steps in the operations for generating the update time T.

Figure 12:
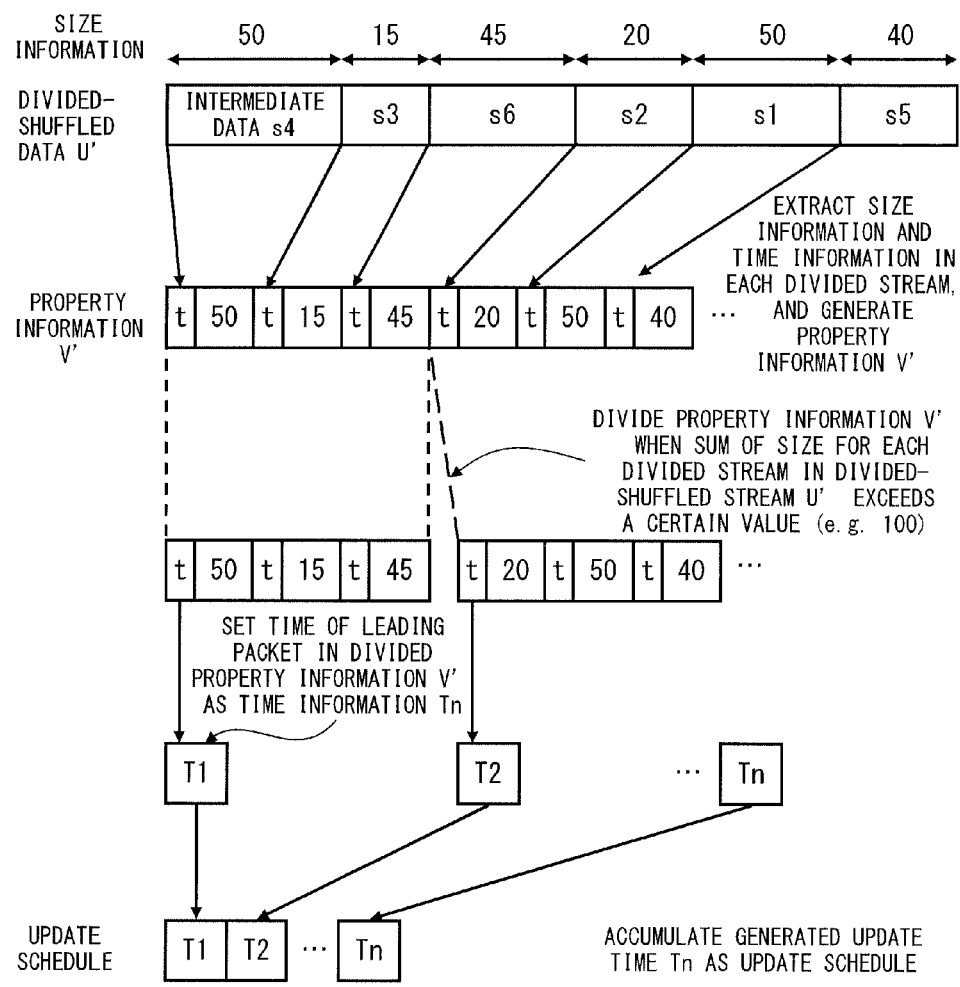
FIG. 12 is a schematic diagram illustrating an example of a mode of determining time information on the basis of the size of the intermediate data according to the second operation example.

As illustrated in the upper portion of FIG. 12, the divided-shuffled data U' has a structure in which each piece of the intermediate data s1, . . . sn having a certain size is shuffled and arranged. FIG. 12 illustrates an example of the divided-shuffled data U' in which pieces of the intermediate data arranged in the order of s1, s2, s3, s4, s5, s6 in the execution result S are shuffled and arranged so that the order becomes s4, s3, s6, s2, s1, s5.

In the example of FIG. 12, the dividing shuffling unit 110 of the program X extracts the size information of each piece of intermediate data s1, . . . sn of the generated divided-shuffled data U' and the time information t embedded in each packet header, and generates the property information V'.

The program generation unit 220 in the server A or the update time generation unit 320 of the program Y executed by the second client C first generates the time information t embedded in a leading packet at the beginning of the divided and shuffled units of the property information V' as the update time T1. Next, the program generation unit 220 or the update time generation unit 320 extracts the size information from the beginning of the property information V' in order, and sequentially adds the extracted size information. Afterwards, the program generation unit 220 or the update time generation unit 320 generates the time information t embedded in the leading packet of the next divided and shuffled unit as the next update time T2 when the sum of the size information exceeds a certain threshold (e.g. 100).

By repeating generation of the update time T on the basis of the sum of the size information in this manner, it is possible to continuously generate the update time T in response to the divided-shuffled data U' (or the original execution result S) that requires real-time processing.

Next, operations to generate the update time T by using the amount of movement for each divided and shuffled unit are explained by reference to FIG. 13. FIG. 13 is a diagram conceptually illustrating data processing steps in the operations for generating the update time T as in FIG. 12. It should be noted that in the example illustrated in FIG. 13, frames constituting the execution result S are adopted as the divided and shuffled unit of the divided-shuffled data U'.

Figure 13:
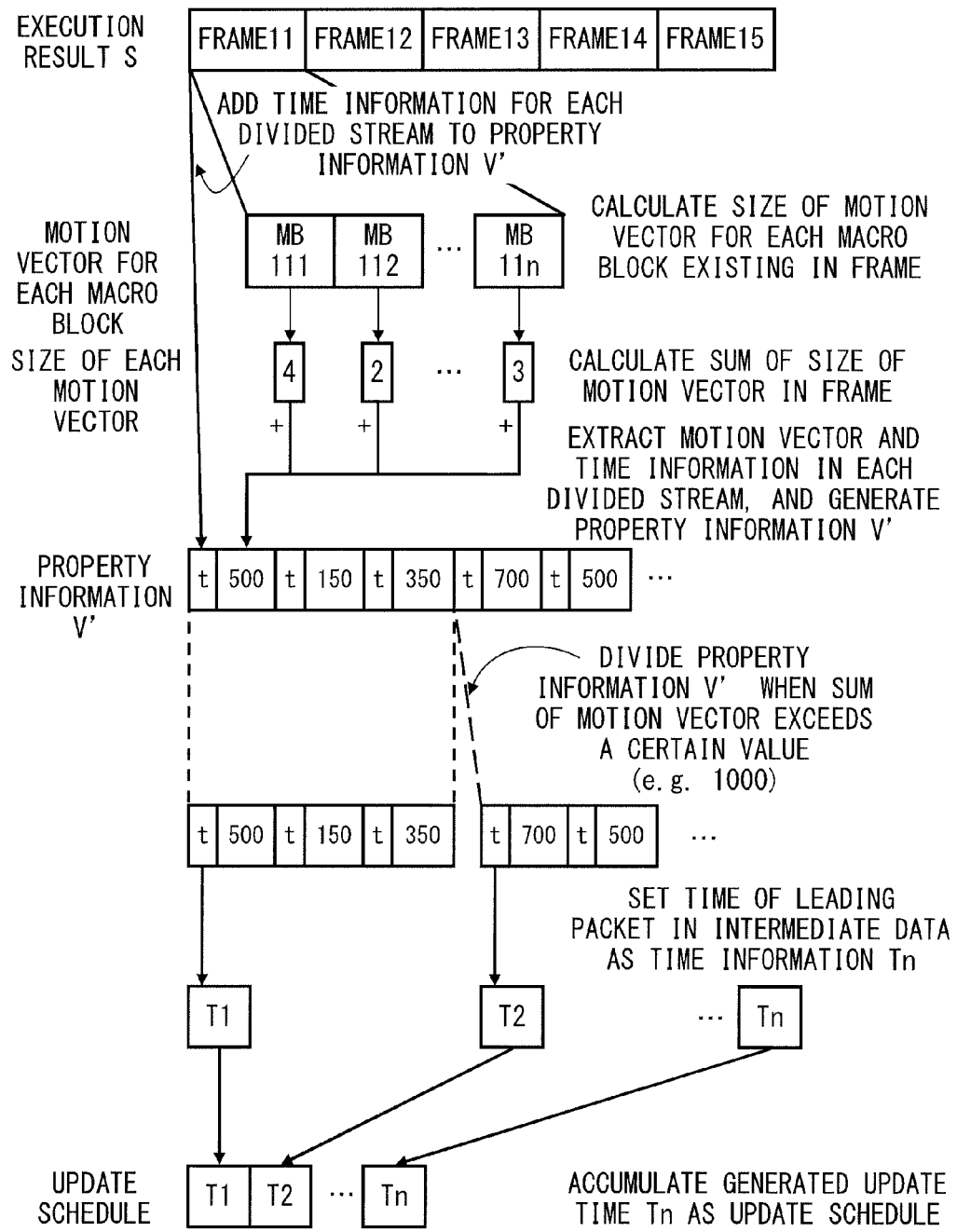
FIG. 13 is a schematic diagram illustrating an example of a mode of determining time information on the basis of the amount of movement of the intermediate data according to the second operation example.

As illustrated in the upper portion of FIG. 13, the divided-shuffled data U' has a structure in which the execution result S is divided into frames and pieces of the divided execution result S are shuffled and arranged. The dividing shuffling unit 110 in the program X extracts the sum of the size of motion vectors of each macro block for each frame of the generated divided-shuffled data U' and the time information t, and generates the property information V'.

The program generation unit 220 in the server A, or the update time generation unit 320 in the program Y executed by the second client C first generate the time information t embedded in the leading packet of the leading frame of the property information V' as update time T1. Next, the program generation unit 220 or the update time generation unit 320 sequentially extracts and adds the sum of the motion vectors for each frame from the beginning of the property information V'. Afterwards, the program generation unit 220 or the update time generation unit 320 generates the time information t embedded in the leading packet of the next frame as the next update time T2 when the sum of the motion vectors exceeds a certain threshold (e.g., 1000).

By repeating generation of the update time T on the basis of the sum of the motion vectors in this manner, it is possible to continuously generate the update time T in response to the divided-shuffled data U' (or the original execution result S) that requires real-time processing.

According to the above-described second operation example of protecting application software, the program X including an application for encoding and the program Y for restoration are transmitted to each client at the same time. At that time, because each of the headers in plural pieces of intermediate data s1, . . . , sn that are divided from the execution result S has time information embedded, it is possible to transmit/receive the execution result S in real time while synchronizing the server A, the first client B, and the second client C with each other, for example. This example is suitably applicable to real-time delivery by using image streams as the execution result S, and the same protection effect as that of the first operation example as described above can be obtained.

In addition, the program X and the program Y of the present operation example are updated while maintaining real-time communication. For this reason, even if a user illegally acquires application software, the program X and the program Y become invalid at every certain update time T. Therefore, the execution result S cannot be restored from the intermediated data s1, . . . , sn, thereby making it possible to protect the execution result S of the application software from unauthorized execution.

Moreover, in the present operation example, the update time T of the program X and the program Y is determined depending on the data in the execution result S. More specifically, the update time T is generated in accordance with the property information V' such as the size information and the amount of motion vectors, which is unique to the divided-shuffled data U'; in other words, it is unique to the original execution result S. Consequently, the respective update times T of the program X and the program Y are consistent only when the programs carry out processing of the identical input data. For that reason, even if a user establishes a pseudoserver and attempts to use the previously acquired application software repeatedly, the original order of the distributed and arranged intermediate data cannot be restored since the input data is different from the previous input data, and the update time T of the program Y and the update time T of the program X as caused by spoofing are different.

In particular, in the present operation example, the update time T of the program X is determined by the server A and is embedded in the program at the time at which the program X is generated. On the other hand, the update time T of the program Y is determined by the second client C. At that time, both of the determination operations are determined in accordance with the execution result S and the divided-shuffled data U', and it is ensured that a proper update is not carried out unless the program X and the program Y handle the identical data.

According to the above-described configuration, in a data transmitting/receiving system such as a teleconference that requires maintaining of connections between clients that transmit/receive the execution result S to/from each other for a relatively long time, the program X and the program Y need to be continuously updated during transmission/reception of the execution result S, and it is possible to realize suitable protection.

Additionally, a program Xn+2 for updating (or a program Yn+2) is transmitted from the server A prior to the update time Tn. Therefore, another advantage is that it is possible to perform dividing and shuffling and to perform restoration of the execution result S that requires real-time processing in a suitable manner without delay.

In the above-described example, the program X generates the divided-shuffled data U' by rearranging the intermediate data s1, . . . sn divided from the execution result S, and transmits the data to the second client C. However, the program X can arrange a portion of the divided-shuffled data U" (i.e., a portion of plural pieces of intermediate data s1, . . . sn) in the server A. At that time, the distribution arrangement unit 110 of the program X can generate the divided-shuffled data U' by arranging the portion of the intermediate data s1, . . . sn in the server A and rearranging another portion in the same manner as the distribution and arrangement mode of the intermediate data s1, . . . sn in the above-described first operation example. Or the distribution and arrangement of the intermediate data s1, . . . , sn can be realized by other methods. With this configuration, it is still possible to obtain the same advantage as that of the above-described second operation example.

The above-described examples explain operation examples in a data transmitting/receiving system including the client B in which the program X is executed and the client C in which the program Y is executed. However, the system may have a configuration in which the program X and the program Y are executed in the same client (e.g., client B). In this case, the server A transmits both the program X and the program Y to the client B, and each of the programs are executed in the client B so that the same advantage as that of the above-described second operation example can be obtained.

The present invention is not to be limited to the above-described embodiments, but can be properly modified within a scope that does not depart from the gist or idea of the invention as understood from the claims and the entire specification. The protection method of the application software and the stream transmitting/receiving system with such a modification is also to be included in the technical scope of the present invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment (s) of the present invention has (have) been described in detail, it should be understood that the various changes, substitutions, and alterations could be made hereto without departing from the spirit and scope of the invention.

What is claimed is:

1. A method for protecting application software executed by initiating on a client a first program transmitted from a server via a network, comprising:
   dividing an execution result of the application software executed on the client into a plurality of pieces of intermediate data in accordance with distribution arrangement information reported by the server, and distributing and arranging the plurality of pieces of intermediate data in the server and the client;
   transmitting to the server notice information including a data length and arranged location information of each piece of the distributed and arranged plurality of pieces of intermediate data;
   generating in the server a second program for rearranging the distributed and arranged plurality of pieces of intermediate data in an original order of the execution result of the application software on the basis of the notice information, and generating the execution result; and
   transmitting the second program to the client.

2. The method for protecting application software according to claim 1, further comprising
   generating the distribution arrangement information in the server on the basis of reliability information of the client and information of a desired secrecy level reported by the client, and transmitting the generated distribution arrangement information to the client.

3. The method for protecting application software according to claim 1, wherein
   the second program generation step generates the second program when a point in time at which the notice information is transmitted from the client is within a certain time period from a point in time at which the client is authenticated.

4. The method for protecting application software according to claim 1, wherein
   the second program rearranges the distributed and arranged plurality of pieces of intermediate data in an original order of the execution result of the application software and generates the execution result after confirming the end of the first program initiated on the client.

5. The method for protecting application software according to claim 1, wherein
   the notice information transmitting step transmits to the server property information indicating a property of the execution result of the application software as well as the notice information, and
   further comprising:
   updating the first program and the second program.

6. The method for protecting application software according to claim 5, wherein
   the execution result of the application software has data of time series,
   the distribution arrangement information generation step embeds time information on the basis of the time series in the execution result of the application software in each of the plurality of pieces of intermediate data,
   the notice information transmitting step transmits the notice information further including the time information and transmits the property information further including the time information to the server, and
   the first and second program update step determines the update time on the basis of the time information included in the property information.

7. The method for protecting application software according to claim 6, wherein the server transmits to the client the first program generated and embedded with information indicating an update time that is determined on the basis of the property information, and the first and second program update step includes updating the first program by comparing the time information embedded in each of the plurality of pieces of intermediate data with the information indicating the update time embedded in the first program.

8. The method for protecting application software according to claim 6, wherein the first and second program update step includes updating the second program by comparing the time information embedded in each of the plurality of pieces of intermediate data with the update time determined on the basis of the property information.

9. The method for protecting application software according to claim 5, wherein the server transmits the first program and the second program to be updated prior to the update time.

10. The method for protecting application software according to claim 6, wherein the notice information transmitting step generates as the property information property information including information indicating an amount of information per unit time in the execution result of the application software, and the first second program update step determines the update time on the basis of the time information included in the property information and the information indicating the amount of information.

11. The method for protecting application software according to claim 6, wherein the notice information transmitting step transmits to the server as the property information property information including information indicating an amount of movement per unit time in the execution result of the application software, and the first and second program update step determines the update time on the basis of the time information included in the property information and the information indicating the amount of movement.

12. The method for protecting application software according to claim 1, wherein the client includes a first client in which the first program is executed and a second client in which the second program is executed, the an execution result dividing step distributes and arranges the plurality of pieces of intermediate data in the server and the second client, and the second program transmission step transmits the second program to the second client.

13. A stream transmitting and receiving system, comprising:

a client; and a server that can transmit a first program including application software executed on the client via a network, wherein the client comprises:

a distribution arrangement unit that divides an execution result of the application software into a plurality of pieces of intermediate data in accordance with distribution arrangement information reported by the server and distributes and arranges the plurality of pieces of intermediate data in the server and the client; and a first transmission unit that transmits to the server notification information including data length and arranged location information of each of the distributed and arranged plurality of pieces of intermediate data, and wherein the server comprises:

a program generation unit that rearranges the distributed and arranged plurality of pieces of intermediate data in an original order of the execution result of the application software on the basis of the notification information, and generates a second program for generating the execution result; and a second transmission unit that transmits the second program to the client.

14. The stream transmitting and receiving system according to claim 13, wherein the client further comprises an update unit that updates the first program and the second program, the first transmission unit transmits to the server property information indicating a property of the execution result of the application software as well as the notice information, the update unit updates the first program and the second program on the basis of an update time determined on the basis of the property information.

15. The stream transmitting and receiving system according to claim 14, wherein the client includes a first client in which the first program is executed and a second client in which the second program is executed, the first client comprises the distribution arrangement unit, the first transmission unit, and the update unit, the second client comprises the update unit, and the second transmission unit transmits the second program to the second client.

* * * * *